July 12, 1955
R. H. GAVER
2,712,861
AUTOMATIC BRAKE SLACK ADJUSTER
Filed Nov. 1, 1951
4 Sheets-Sheet 1
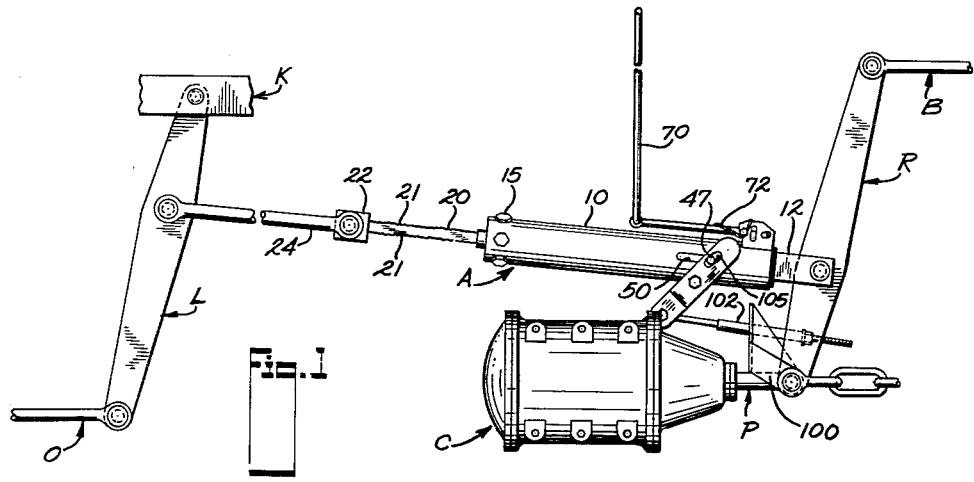
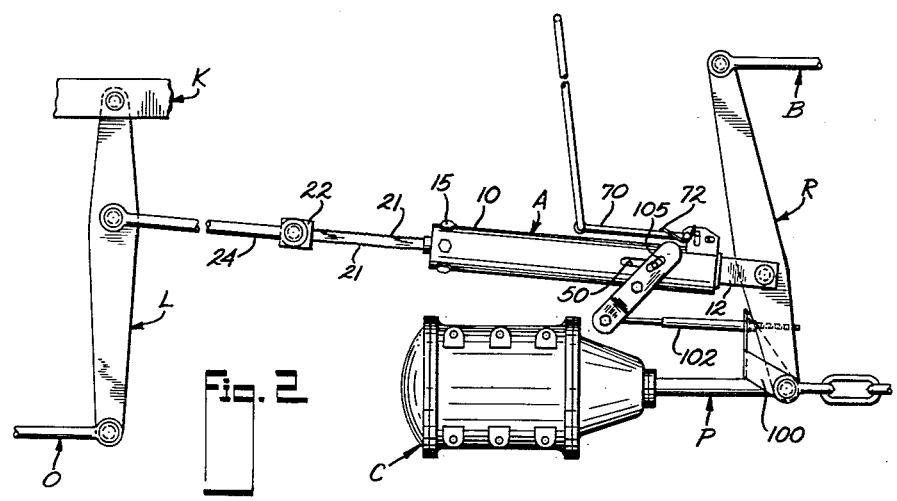
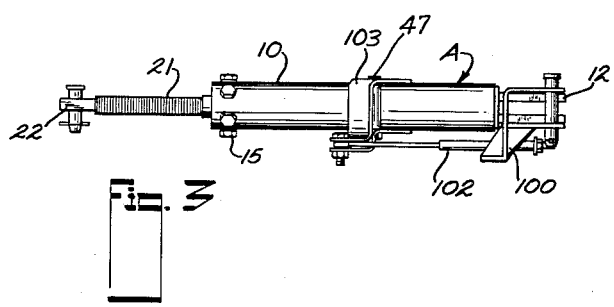
INVENTOR.
RAYMOND H. GAVER
BY *Richey & Watts*
ATTORNEYS

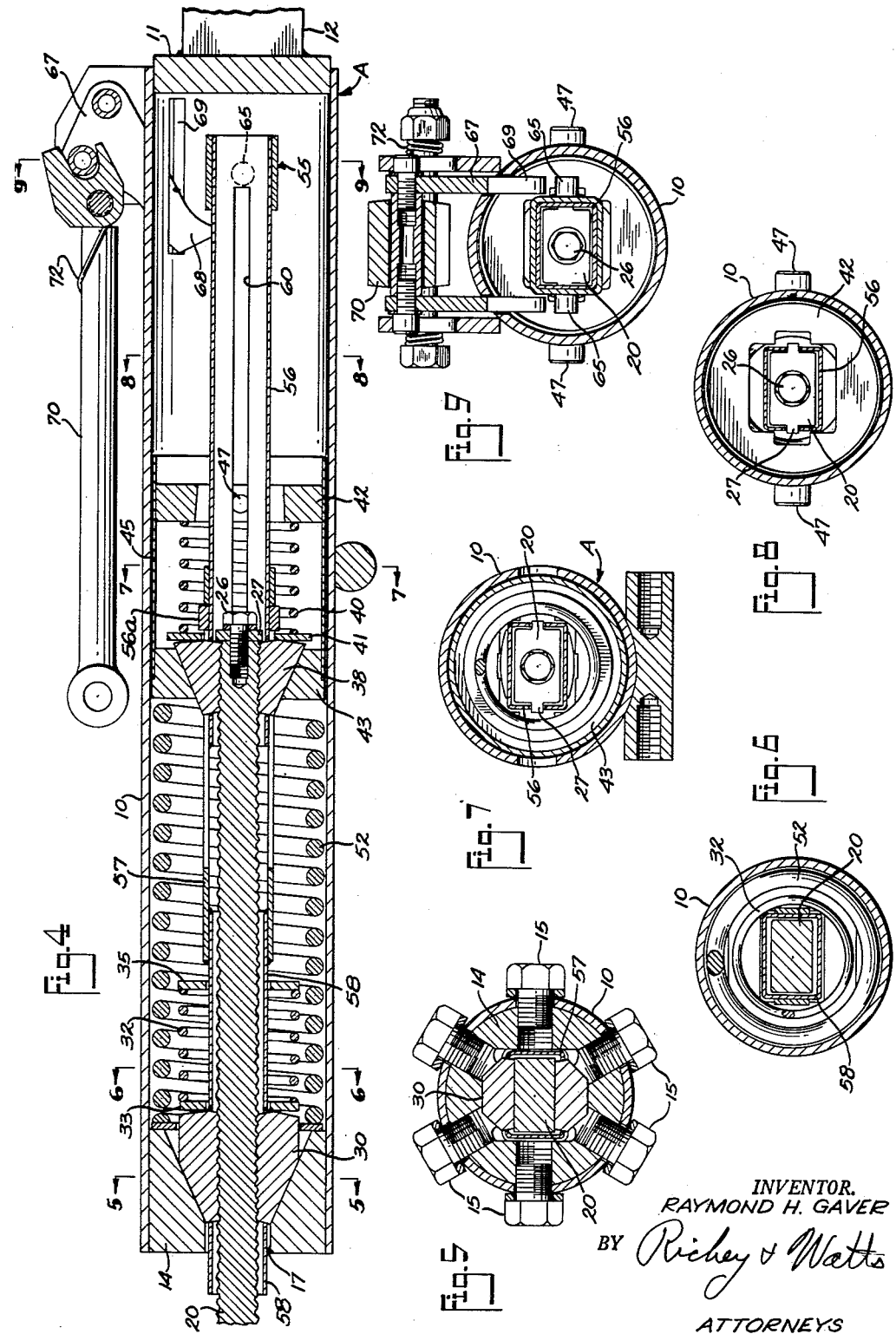

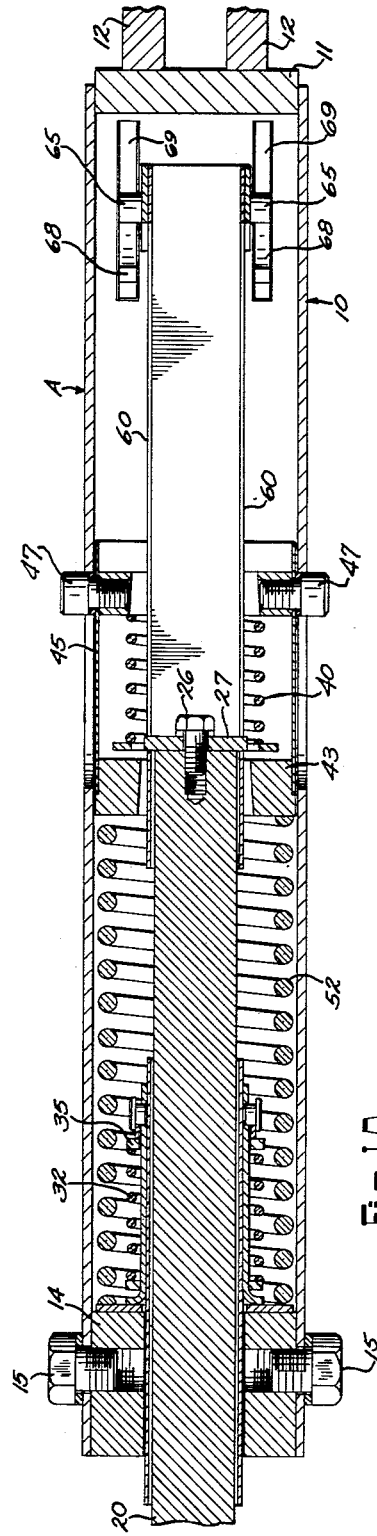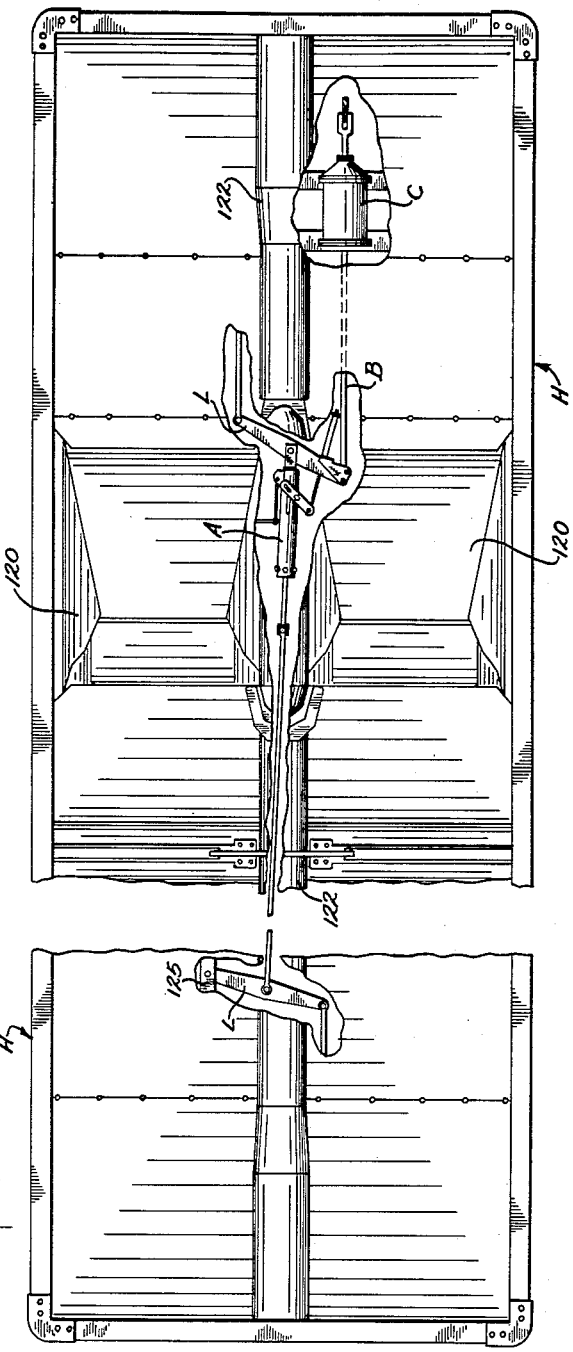
Fig. 10
Fig. 11
INVENTOR.
RAYMOND H. GAVER
BY Richey & Watts
ATTORNEYS

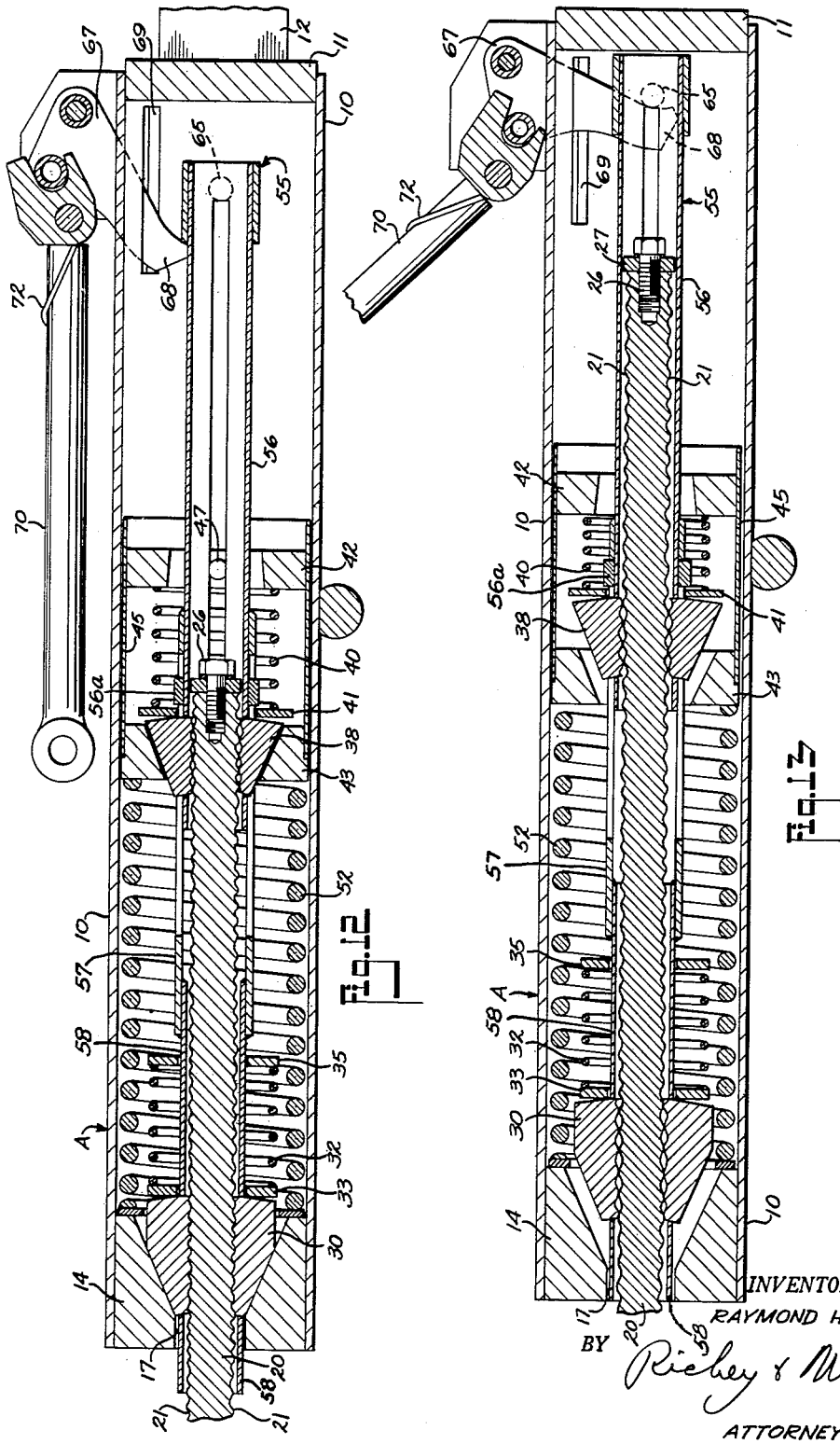

United States Patent Office 2,712,861
Patented July 12, 1955

2,712,861

AUTOMATIC BRAKE SLACK ADJUSTER

Raymond H. Gaver, Warren, Ohio, assignor to The American Welding & Manufacturing Company, Warren, Ohio, a corporation of Ohio Application November 1, 1951, Serial No. 254,358

4 Claims. (Cl. 188—199)

The present invention relates generally to brake slack adjusters and is more particularly concerned with a brake slack adjuster for railway cars which is novel in construction and mode of operation and which produces unique results and is generally superior to slack adjusters now in commercial use.

Although the problem of providing some means for automatically adjusting the slack in brakes of railway cars has long been before those skilled in the art, to the best of my knowledge no one has hitherto come forth with a device, system, or mechanism meeting the problem in a thoroughly satisfactory manner. One prime requisite of a brake slack adjuster is physical strength and durability, since failure in use presents a great safety hazard. Another important requirement is that the device be proof against weather and other conditions of its operation, since cinders tend to clog and foul these devices and failure for this reason is also quite dangerous. In addition, the device should be readily installable and removable to minimize labor and time involved in servicing, maintenance, and replacement. Still further, the device should be easily tested and should not require complete disassembly and preferably should not require removal from the brake system of a car. It is also to be desired that the device be readily assembled and disassembled.

The brake slack adjusters presently generally employed on railway equipment in this country represent the best that has hitherto been developed in the art. However, these commercially successful devices all represent compromises between the foregoing various requirements and are, therefore, not satisfactory, assuming something fully meeting all these requirements to be available.

In accordance with the present invention, all the foregoing requirements are fully met, and a substantial contribution to the art is made by providing a device which affords substantial advantages of economy and convenience and of size permitting installations never heretofore possible although long in persistent demand.

The devices of this invention afford greater strength and a higher safety factor than the strongest and safest devices of this type in the prior art. This advantage is due to the novel design and construction of the present slack adjusters in which substantially greater bearing areas are provided; and, at the same time, the advantage of unusually small increments of adjustment is obtained.

Additionally, the weather and cinder-tightness of the present devices is obtained without incurring any disadvantage of inaccessibility or repair and replacement difficulty.

Beyond these advantages, the devices of this invention are readily substituted for the prior art slack adjusters in existing railway car brake systems, not requiring special expensive procedures or significant time loss regardless of whether the substitution is made in a pneumatic or a hydraulic operated system and regardless of the form of brake rigging concerned.

Since no secondary fulcrum is required, the devices of this invention are uniquely compact, they may be installed in any railway car brake system and can even be applied to the center rod between the hoppers of a hopper car where no other slack adjuster can be installed because of the severe space limitations.

As still another advantage, the devices of this invention require no welding, riveting, bolting or other similar means for installation whether original or replacement, and their removal is substantially more easily accomplished than in accordance with the best prior art practices.

Those skilled in the art will gain a further understanding of the present invention on consideration of the detailed description set out below, reference being had to the drawings accompanying and forming a part of this specification, in which:

Fig. 1 is a fragmentary plan view of one form of brake actuating mechanism incorporating a slack adjuster embodying the present invention in a preferred form;

Fig. 2 is a view like Fig. 1, showing elements of the system in alternative position, the brakes of the car with which it is associated being applied at this stage;

Fig. 3 is a side elevational view of the brake slack adjuster unit of Figs. 1 and 2;

Fig. 4 is a longitudinal sectional view of the brake slack adjuster unit of Fig. 3, shown fully extended as normal at the time of its instillation in the system of Fig. 1;

Fig. 5 is a cross-sectional view taken on line 5—5 of Fig. 4;

Fig. 6 is a cross-sectional view taken on line 6—6 of Fig. 4;

Fig. 7 is a cross-sectional view taken on line 7—7 of Fig. 4;

Fig. 8 is a cross-sectional view taken on line 8—8 of Fig. 4;

Fig. 9 is a cross-sectional view taken on line 9—9 of Fig. 4;

Fig. 10 is a longitudinal sectional view of the brake slack adjuster of Fig. 4 taken at right angles to the section of Fig. 4;

Fig. 11 is a plan view of a typical hopper car equipped with brake actuating means including a slack adjuster of this invention, parts of the car being broken away to illustrate the said means.

Fig. 12 is a view like Fig. 4, but showing the relative position of the parts when slack in the brake system is about to be taken up automatically by the adjuster operating in response to brake-applying force; and Fig. 13 is a view similar to those of Figs. 4 and 12, showing the relative position of the operating parts as the adjuster is being reset to its starting condition shown in Fig. 4.

As will be apparent from the accompanying drawings, in general an automatic brake slack adjuster of this invention comprises an elongated hollow body, a rack movable longitudinally within the body and extending through one end thereof for attachment to a brake rod, jaw means in the body for engagement and travel with the rack relative to the body, abutment means with the body to engage and wedge the jaw means against the rack, and means for moving the rack relative to the body to disengage the jaw means from the abutment means. In addition, the assembly preferably includes means within the body and bearing against and resiliently urging the jaw means into firm engagement with the abutment means to assure secure engagement and locking of the rack relative to the body so that slack once taken up will not be paid out to establish a dangerous condition. The assembly preferably also includes a second jaw means and movable abutment means, both in the body, to facilitate automatic take-up of the brake slack and to assure uniform effective brake application at all times. Still further, this adjuster assembly includes means to release the rack from the two sets of jaw means for readjustment or resetting to its original extended position.

More particularly and with reference to the aforesaid drawings, the slack adjuster A of this invention is of metal construction throughout and comprises an open-ended tube 10 in one end of which a metal disc 11 is disposed and secured in any suitable manner as by welds to completely close that end of the tube. A clevis 12 is attached to the disc and projects outwardly therefrom, being provided with registered apertures near its free end for a purpose subsequently to be described. Within the other end of the tube, a power jaw ring 14 is disposed and secured in place by means of six spaced radial bolts 15 as best seen in Fig. 5, openings being provided adjacent to the end portion of the tube to receive them. Ring 14 has an axial aperture 17, the inner end of which is defined in part by opposed walls which flare outwardly toward the interior of tube 10 to define a pair of opposed diverging plane surfaces. An elongated bar 20 of substantially rectangular cross-section with serrations 21 extending for its full length is disposed within tube 10 and extends from this tube through opening 17, terminating in a transversely apertured portion 22 by means of which the rack is secured to a brake rod 24. The other end of the rack is tapped to receive a bolt 26 by means of which a stop plate 27 may be fastened to the rack and held in firm engagement therewith.

To assist in maintaining rack 20 in relative position to body 10, a pair of opposed power jaws 30 having serrated opposed face portions to engage opposite sides 21 of the rack are disposed in the body and provided with sloping outwardly facing surfaces for engagement with the outwardly flared portion of ring 14. Jaws 30 are formed in such a way relative to ring 14 that when these jaws are in locking position against the ring and the rack, as shown in Fig. 4, the mating surfaces of the ring and jaws fit perfectly together. The leading end portions of jaws 30 are turned slightly inwardly to define a large angle with the sloping outer side portions, while the rear side surface of these jaws in each case is more or less parallel to these leading end portions. Jaws 30 are resiliently urged into engagement with jaw ring 14 to lock the jaws against rack 20 by means of a compression spring 32 disposed against a compression disc 33 bearing on the rear side of jaws 30 and encircling the rack. Spring 32 is held against disc 33 by a back-up disc 35.

A pair of take-up jaws 38 are provided to engage opposed serrated sides 21 of the rack within tubular body 10, the inner faces of these take-up jaws being serrated like those of power jaws 30 for indexing and locking engagement with the rack. Take-up jaws 38, like the power jaws, are provided with sloping outer side surfaces for a wedge effect and with leading and surface portions disposed at a large angle of these sloping side surface portions. The rear sides of jaws 38 are formed substantially like those of jaws 30. Jaws 38 are urged constantly and resiliently toward an advanced position in the direction of the power jaws by means of a compression spring 40 bearing against a jaw retaining ring 41 and backed up by a compression ring 42. The take-up jaws, however, are restrained against such advanced motion by means of a take-up jaw ring 43, which together with compression ring 42, is mounted in tube 10 for motion axially relative to the said tube, rings 42 and 43 being spaced apart and fixed in position relative to each other and contained in a guide tube 45 which is movable axially within tube 10 and also contains the take-up jaws, jaw retaining ring and the take-up jaw spring.

Ring 43 has an axial aperture defined in part by opposed flared walls so that wedge-shaped jaws 38 are wedged against rack 20 and normally closely engaged with jaw ring 43 over the entire opposed areas of each, as best seen in Fig. 4. Ring 42 likewise has an axial opening to receive the rack and is provided with trunnions or lugs 47 which extend outwardly diametrically through slots 50 provided in opposite sides of the tubular shell 10 to engage actuating mechanism to be described.

A compression operating spring 52 is disposed in tubular housing 10 of the assembly and bears against the take-up jaw assembly, engaging the forward face of take-up jaw ring 43. At its other end, spring 52 bears on the power jaw spring assembly and thus serves normally to maintain the two sets of jaws at a constant predetermined distance part, preventing advancement of the take-up jaw ring assembly along the rack.

A fabricated inner body 55 extends from adjacent to disc 11 within tube 10 to a point outside the opposite end of this tube, and is provided with openings to receive power jaws 30 and take-up jaws 38 so that movement of these jaws relative to the tube 10 may be accomplished by moving this inner body. Actually body 55 is made up of two pairs of bars and a tube 56. Tube 56 extends from adjacent to disc 11 to a point just in advance of take-up jaws 38, while one set of bars 57 extends from within the take-up jaw assembly to a point between the take-up jaws and the power jaws and bars 58 extend from within the ends of bars 57 between said jaw sets to a point outside tube 10. Bars 57 are welded together at their adjacent ends to bars 58 and are movable axially of tube 10 relative to tube 56, which extends telescopically into the other ends of bars 57 in the take-up assembly. Tube 56 carries a pair of lugs 56a which are suitably welded to it for engagement with the ends of bars 57 remote from bars 58. Thus, with lugs 56a disposed between bars 57, tube 56 may be moved forwardly of the adjuster a limited distance relative to bars 57 and 58. Motion of tube 56 in the reverse direction results in releasing first take-up jaws 38 and later release of power jaws 30. The purpose of such an operation is the resetting of rack 20 to its original or starting position. In addition to serving the foregoing functions, tube 56 is designed to engage end portions of rack stop 27 for guiding motion of the rack lengthwise of the main housing 10.

Adjacent to the inner end of tube 55, a pair of lugs 65 are provided extending outwardly from diametrically opposite side portions of the tube for engagement with a hand-operated lever 67 pivotally mounted outside and supported on shell 10 and provided with free end portion 68 extending through openings 69 in said shell to engage lugs 65.

Lever 67 is part of the reset assembly, which also includes a handle 70, a spring 72 associated with handle 70 to hold it resiliently in position so that lever 67 is retracted from lugs 65. Handle 70 has a portion extending outwardly to a point adjacent to the side of the car where it may be reached by the brakeman to reset the slack adjuster when necessary.

As shown in Figs. 1 and 2, a slack adjuster of this invention is suitably incorporated in a brake system of a railway car by being operatively disposed between brake lever R and a brake lever L. Clevis 12 of adjuster A is pivotally attached to cylinder lever R between its ends, one end of lever R being pivotally connected to piston rod P of cylinder C, while the other end is similarly connected to a brake rod B. Adjuster A is supported at its other end by brake rod 24, one end of which is pivotally attached to lever L between its ends. Lever L is pivotally connected at one end to a fulcrum bracket K and at its other end to another brake rod O. The operating connection between cylinder C and slack adjuster A is made by means of a control bracket 100, which is connected to the free end of piston rod P, and a control rod 102 which is adjustably associated with bracket 100 for movement therewith and with rod P when the brakes are to be applied. A yoke 103 is connected to rod 102 at one end and pivotally attached between its ends to body 10 and engaged with trunnions 47 of the take-up assembly, being provided with an annular slot 105 in each leg in which these trunnions are received. As a result of this arrangement and interconnection of these parts when the apparatus is operated, as hereinafter described in detail, slack is taken up in the system according to the amount of movement of trunnions or lugs 47 relative to tube 10 of adjuster A. This motion is produced when yoke 103 is moved about its pivot point as a result of travel of bracket 100 away from cylinder C and movement of control rod 102 with the bracket 100.

As illustrated in Fig. 11, a slack adjuster of the invention is suitably incorporated in a brake system of a hopper car H by being disposed longitudinally of the car midway between the sides thereof and between opposed hoppers 120 in the central sill section 122. Cylinder C in this installation is suitably located near one end of the car in conventional manner and is operatively connected to adjuster A by brake lever R and control rod 102, as described above in reference to Fig. 1. Brake lever L is anchored to a fulcrum bracket 125 attached to the car so that said lever L may move in response to actuations of cylinder C relayed through adjuster A to apply or release brakes on one of the tracks (not shown) of car H.

In operation, the assembly of Fig. 1 is used to apply brakes to a car by actuating cylinder C by any suitable conventional means known to those skilled in the art. Starting from the position shown in Fig. 1, piston rod P is thereby urged to the right, carrying along the lower end of lever R and bracket 100 and control rod 102, depending upon the adjustment that has been made in the effective length of the control rod. Adjuster A is also moved to the right with the cylinder lever as seen in Fig. 2. Brake lever L is drawn by this motion around its pivot so that the brakes of both sets of trucks may be assumed to be applied. If there is no slack in the brake linkages due to wear of the shoes or some other cause, adjuster A will operate in effect as a rigid member connecting levers L and R to produce the desired motion of these two elements. However, when slack exists in the system so that the brakes are not applied uniformly and adequately when cylinder C is actuated, the slack adjuster mechanism comes into effect and automatically takes up this slack to assure the required braking results at all times.

Comparison of relative position to the moving parts of the slack adjuster in Figs. 4, 12 and 13 will serve to illustrate how this result is obtained. Starting from the normal position shown in Fig. 4, the take-up mechanism is actuated when the brakes are applied through cylinder C when there is slack in the system.

As seen in Fig. 12, take-up guide tube 45 and its rings 42 and 43 are moved relative to the rack toward the power jaws at the forward end of the slack adjuster. This motion permits jaws 38 to move forwardly indexing themselves along rack 20 in response to the resiliently applied force of spring 40. When this relative motion of tube 45 stops at the point where the slack of the brakes is taken up at the desired or predetermined extent, spring 40 again wedges the jaws 38 against ring 43, locking the jaws on the rack. Then when the force applied to cause movement of the take-up assembly against operating spring 52 is released, this spring resiliently forces the take-up assembly back toward its original position so that the rack is carried along axially of shell 10 according to the amount of relative motion due to slack which has just previously occurred between the take-up jaws and the rack. The rack in thus moving draws power jaws 30 away from power jaw ring 14, permitting these jaws to release the rack. When this motion is completed, the power jaws are once again wedged against the power jaw ring by power jaw spring 32 and the slack adjuster is ready to operate again to take up slack as it develops in the system.

This adjustment in the effective length in the rack continues in ordinary operation as necessary until there is no more adjustment possible. The adjuster is then reset to its original position, new brake shoes having been installed to permit this or other suitable adjustments or repairs having been made in the linkage. The resetting is accomplished, as indicated above, by manual operation of the reset mechanism, the brakeman turning reset handle 70 to the position shown in Fig. 13 and thereby turning reset lever 67 against lugs 65 and pulling tube 55 endwise into shell 10. This action results in drawing of the two sets of jaws away from their wedging jaw rings and into the position illustrated in Fig. 13, thereby unlocking the rack. The rack then may be pulled out to its full effective length whereupon reset handle 70 is released to permit reset handle spring 72 to restore the handle and reset lever 67 to their normal positions shown in Fig. 12.

It will be understood from the foregoing description of the Fig. 11 installation that the operation of the brake system illustrated therein and function and mode of operation and the adjuster of this invention in that system generally is as described above in reference to the assembly shown in Fig. 1.

It will be apparent from the drawings that assembly and disassembly and maintenance and repair of the slack adjuster mechanism of this invention is readily accomplished. It will also be understood that there is relatively little need here for special attentions customary in the prior art because of unique, substantially complete enclosure of the operating elements and the practically weather-proof and cinder-proof housing of the adjusters of this invention. This latter advantage is also attributable in part to the limited wear of the parts due to the large areas of the engaged locking and gripping surfaces. It will also be apparent that while the adjuster is substantially completely closed, it is still readily possible to determine whether it is in operating condition without taking it apart or opening it up, simply by noting the movement of the exposed end of tube 56 on actuation of the reset mechanism, as will be seen on comparison of Figs. 12 and 13.

Having thus described the present invention so that others skilled in the art may be able to understand and practice the same, I state that what I desire to secure by Letters Patent is defined in what is claimed.

I claim:

1. An automatic brake slack adjusted assembly comprising an elongated hollow body, a rack movable longitudinally in the body and extending through one end thereof for attachment to a brake rod, power jaw means in the body for locking engagement and travel with the rack relative to said body, stationary abutment means within the body and adjacent to the said one end thereof to engage and wedge said jaw means against the rack, take-up jaw means in the body for locking engagement and travel with the rack relative to the body, movable abutment means in the body to engage and wedge said take-up jaw means against the rack, and means extending longitudinally of the body and disposed therein in engagement with the power jaw means and the take-up jaw means for moving both said jaw means relative to the stationary and movable abutment means to release the rack for readjustment relative to both said jaw means.

2. An automatic brake slack adjuster assembly comprising an elongated hollow body, a rack movable longitudinally in the body and extending through one end thereof for attachment to a brake rod, power jaw means in the body for locking engagement and travel with the rack relative to said body, stationary abutment means within the body and adjacent to the said one end thereof to engage and wedge said jaw means against the rack, means in the body bearing against and resiliently urging said power jaw means into firm engagement with the stationary abutment means, take-up jaw means in the body for locking engagement and travel with the rack relative to the body, movable abutment means in the body to engage and wedge said take-up jaw means against the rack, resilient means in the body bearing against and resiliently urging said take-up jaw means into firm engagement with said movable abutment means, and means extending longitudinally of the body and disposed therein in engagement with the power jaw means and the take-up jaw means for moving both said jaw means relative to the stationary and movable abutment means to release the rack for readjustment relative to both said jaw means.

3. An automatic brake slack adjuster assembly comprising an elongated hollow body, a rack movable longitudinally in the body and extending through one end thereof for attachment to a brake rod, power jaw means in the body for locking engagement and travel with the rack relative to said body, stationary abutment means within the body and adjacent to the said one end thereof to engage and wedge said jaw means against the rack, means including a spring in the body disposed between the stationary abutment means and the movable abutment means and bearing against and resiliently urging said power jaw means into firm engagement with the stationary means, take-up jaw means in the body for locking engagement and travel with the rack relative to the body, movable abutment means in the body to engage and wedge said take-up jaw means against the rack, resilient means including a second spring in the body bearing against and resiliently urging said take-up jaw means into firm engagement with said movable abutment means, means engaging the movable abutment means for moving said movable abutment means longitudinally of the body and toward said stationary abutment means, and resilient means including a third spring in the body bearing against and resiliently urging the said movable abutment means longitudinally of the body away from said stationary abutment means.

4. An automatic brake slack adjuster assembly comprising an elongated hollow body, a rack movable longitudinally in the body and extending through one end thereof for attachment to a brake rod, power jaw means in the body for locking engagement and travel with the rack relative to said body, stationary abutment means within the body and adjacent to the said one end thereof to engage and wedge said jaw means against the rack, take-up jaw means in the body for locking engagement and travel with the rack relative to the body, movable abutment means in the body to engage and wedge said take-up jaw means against the rack, and means including an elongated member extending longitudinally of the body and disposed therein for engagement with the said power jaw means and take-up jaw means to move both said jaw means relative to the stationary and the movable abutment means to release the rack.

References Cited in the file of this patent

UNITED STATES PATENTS

| | | |
|---|---|---|
| 1,804,309 | Bourbeau | May 5, 1931 |
| 2,084,989 | Browall | June 29, 1937 |
| 2,559,779 | Martin | July 10, 1951 |
| 2,620,902 | Wilson | Dec. 9, 1952 |

FOREIGN PATENTS

| | | |
|---|---|---|
| 645,059 | Germany | May 20, 1937 |
| 164,117 | Austria | Oct. 10, 1949 |
| 39,553 | France | Sept. 1, 1931 |
| | (Addition to No. 693,624) | |